United States Patent
Lee et al.

(10) Patent No.: US 8,131,595 B2
(45) Date of Patent: Mar. 6, 2012

(54) PRODUCTS AND PROCESSES FOR A MEMBERSHIP FOR A CUSTOMER OF A VENDING MACHINE

(75) Inventors: Sih Y. Lee, Northvale, NJ (US); Jay S. Walker, Ridgefield, CT (US); Paul T. Breitenbach, Wilton, CT (US); Daniel E. Tedesco, Shelton, CT (US)

(73) Assignee: Walker Digital, LLC, Stamford, CT (US)

( * ) Notice: Subject to any disclaimer, the term of this patent is extended or adjusted under 35 U.S.C. 154(b) by 1140 days.

(21) Appl. No.: 11/571,062

(22) PCT Filed: Jun. 29, 2005

(86) PCT No.: PCT/US2005/023029
§ 371 (c)(1),
(2), (4) Date: Nov. 21, 2007

(87) PCT Pub. No.: WO2006/004802
PCT Pub. Date: Jan. 12, 2006

(65) Prior Publication Data
US 2008/0201213 A1 Aug. 21, 2008

Related U.S. Application Data

(60) Provisional application No. 60/583,653, filed on Jun. 29, 2004, provisional application No. 60/662,139, filed on Mar. 15, 2005, provisional application No. 60/668,405, filed on Apr. 5, 2005.

(51) Int. Cl.
*G06Q 30/00* (2006.01)
*G06Q 20/00* (2006.01)

(52) U.S. Cl. .......................... 705/15; 705/16

(58) Field of Classification Search .................. 705/15, 705/16
See application file for complete search history.

(56) References Cited

U.S. PATENT DOCUMENTS

| 5,694,546 A * | 12/1997 | Reisman .................. 705/27.1 |
| 5,822,216 A * | 10/1998 | Satchell et al. ............... 700/232 |
| 5,988,346 A * | 11/1999 | Tedesco et al. ............... 194/217 |
| 6,085,888 A * | 7/2000 | Tedesco et al. ............... 194/217 |
| 6,298,972 B1 * | 10/2001 | Tedesco et al. ............... 194/217 |
| 6,519,571 B1 * | 2/2003 | Guheen et al. .............. 705/14.66 |
| 2002/0087525 A1 * | 7/2002 | Abbott et al. ..................... 707/3 |
| 2006/0293956 A1 * | 12/2006 | Walker et al. ................... 705/14 |

OTHER PUBLICATIONS

International Search Report dated Sep. 23, 2005, 3pp.
Written Opinion of the International Searching Authority dated Sep. 23, 2005, 3pp.

* cited by examiner

*Primary Examiner* — Thomas Dixon
*Assistant Examiner* — Gerald Vizvary
(74) *Attorney, Agent, or Firm* — Fincham Downs, LLC; Carson C.K. Fincham

(57) ABSTRACT

In a disclosed embodiment of the invention, a customer of a vending machine is provided with an offer to establish a membership at a vending machine. After receiving an acceptance of the offer, a membership identifier is determined. The membership identifier is stored in association with the term of the membership.

After the step of storing, the membership identifier is received. The term of the membership is determined. A selection of a product that the customer intends to purchase is received from the customer, and a transaction is processed at the vending machine in accordance with the term and the selection.

20 Claims, 11 Drawing Sheets

120 (CONT.)

| MINIMUM SELLING PRICE | COST | ACTUAL (CURRENT) PRODUCT VELOCITY | IDEAL PRODUCT VELOCITY | CURRENT NUMBER IN STOCK |
|---|---|---|---|---|
| $0.40 | $0.20 | 0.5 / DAY | 3.0 / DAY | 5 |
| $0.40 | $0.20 | 0 / DAY | 3.0 / DAY | 4 |
| $0.35 | $0.25 | 0.5 / DAY | 4.0 / DAY | 3 |
| $0.35 | $0.20 | 0 / DAY | 3.0 / DAY | 6 |
| $0.25 | $0.20 | 0.5 / DAY | 2.0 / DAY | 4 |
| $0.35 | $0.27 | 1.0 / DAY | 2.0 / DAY | 5 |
| $0.50 | $0.25 | 0.5 / DAY | 3.0 / DAY | 4 |
| $0.50 | $0.20 | 0 / DAY | 2.0 / DAY | 2 |
| $0.75 | $0.30 | 1.0 / DAY | 3.0 / DAY | 2 |

| MEMBERSHIP TYPE | CONDITIONS FOR OUTPUT OF MEMBERSHP OFFER | MEMBERSHIP OFFER CONTENT | CONDITIONS FOR REGISTRATION OF MEMBERSHIP | MEMBERSHIP BENEFITS | MEMBERSHIP DURATION |
|---|---|---|---|---|---|
| "COST CLUB CARD" | AVERAGE ACTUAL PRODUCT VELOCITY LESS THAN HALF OF AVERAGE IDEAL PRODUCT VELOCITY | "FOR JUST $30, YOU CAN JOIN OUR COST CLUB AND GET ALL ITEMS AT WHOLESALE PRICES!" | CUSTOMER DEPOSITS $30 IN CASH OR AUTHORIZES $30 CHARGE TO CREDIT/ DEBIT CARD | CUSTOMER PRESENTING VALID MEMBERSHIP IDENTIFIER MAY BUY PRODUCTS FOR "COST" AMOUNT | ONE YEAR FROM DATE OF PURCHASE |
| "SALE PRICE CLUB CARD" | AVERAGE ACTUAL PRODUCT VELOCITY < AVERAGE IDEAL PRODUCT VELOCITY | "FOR JUST $10, YOU CAN GET ACCESS TO GREAT SALES THROUGHOUT THE YEAR!" | CUSTOMER DEPOSITS $10 IN CASH OR AUTHORIZES $10 CHARGE TO CREDIT/ DEBIT CARD | CUSTOMER PRESENTING VALID MEMBERSHIP IDENTIFIER MAY BUY DESIGNATED "SALE" ITEMS AT POSTED SALE PRICES | ONE YEAR FROM DATE OF PURCHASE |

| MEMBERSHIP IDENTIFIER | MEMBERSHIP TYPE | CUSTOMER NAME | MEMBERSHIP EXPIRATION TIME / DATE |
|---|---|---|---|
| (203) 555-1212 | "SALE PRICE CLUB CARD" | BOB JONES | JUNE 18, 2005 |

FIG. 6

PRODUCTS AND PROCESSES FOR A MEMBERSHIP FOR A CUSTOMER OF A VENDING MACHINE

CROSS REFERENCE

The present application claims the benefit of (i) International Application No. PCT/US2005/023029 filed Jun. 29, 2005 and published as WO2006/004802 A1 on Jan. 12, 2006 in the name of Lee et al. and entitled "PRODUCTS AND PROCESSES FOR A MEMBERSHIP FOR A CUSTOMER OF A VENDING MACHINE";

(ii) U.S. Provisional Application Ser. No. 60/583,653, filed Jun. 29, 2004 in the name of Lee et al. and entitled "APPARATUS, SYSTEMS AND METHODS FOR VENDING MACHINE CUSTOMER MEMBERSHIPS";

(iii) U.S. Provisional Patent Application Ser. No. 60/662,139, filed Mar. 15, 2005 in the name of Signorelli et al. and entitled "WiFi VENDING MACHINE"; and (iv) U.S. Provisional Patent Application Ser. No. 60/668,405, filed Apr. 5, 2005 in the name of Walker et al. and entitled "PRODUCTS AND PROCESSES FOR ESTABLISHING MULTI-TRANSACTION RELATIONSHIPS WITH CUSTOMERS OF VENDING MACHINES".

The entirety of each of the above is incorporated by reference herein.

The following applications and patents could be considered relevant to the present application: Applicant's U.S. Provisional Patent Application No. 60/527,988, entitled APPARATUS, SYSTEM AND METHOD FOR ESTABLISHING MULTI-TRANSACTION RELATIONSHIPS WITH VENDING MACHINE CUSTOMERS, filed Dec. 9, 2003; U.S. Pat. No. 6,298,972, entitled METHOD AND APPARATUS FOR ESTABLISHING AND MANAGING VENDING MACHINE SUBSCRIPTIONS, issued Oct. 9, 2001; U.S. Pat. No. 6,085,888, entitled METHOD AND APPARATUS FOR ESTABLISHING AND MANAGING VENDING MACHINE SUBSCRIPTIONS, issued Jul. 11, 2000; and U.S. Pat. No. 5,988,346, entitled METHOD AND APPARATUS FOR ESTABLISHING AND MANAGING VENDING MACHINE SUBSCRIPTIONS, issued Nov. 23, 1999. the entirety of each of the above is incorporated herein by reference.

BRIEF DESCRIPTION OF THE FIGURES

FIGS. 4A and 4B are a table illustrating an example data structure of an example product inventory database.

FIG. 5 is a table illustrating an example data structure of an example membership rules database.

FIG. 6 is a table illustrating an example data structure of an example member database.

DETAILED DESCRIPTION

Terms

Figure 1:
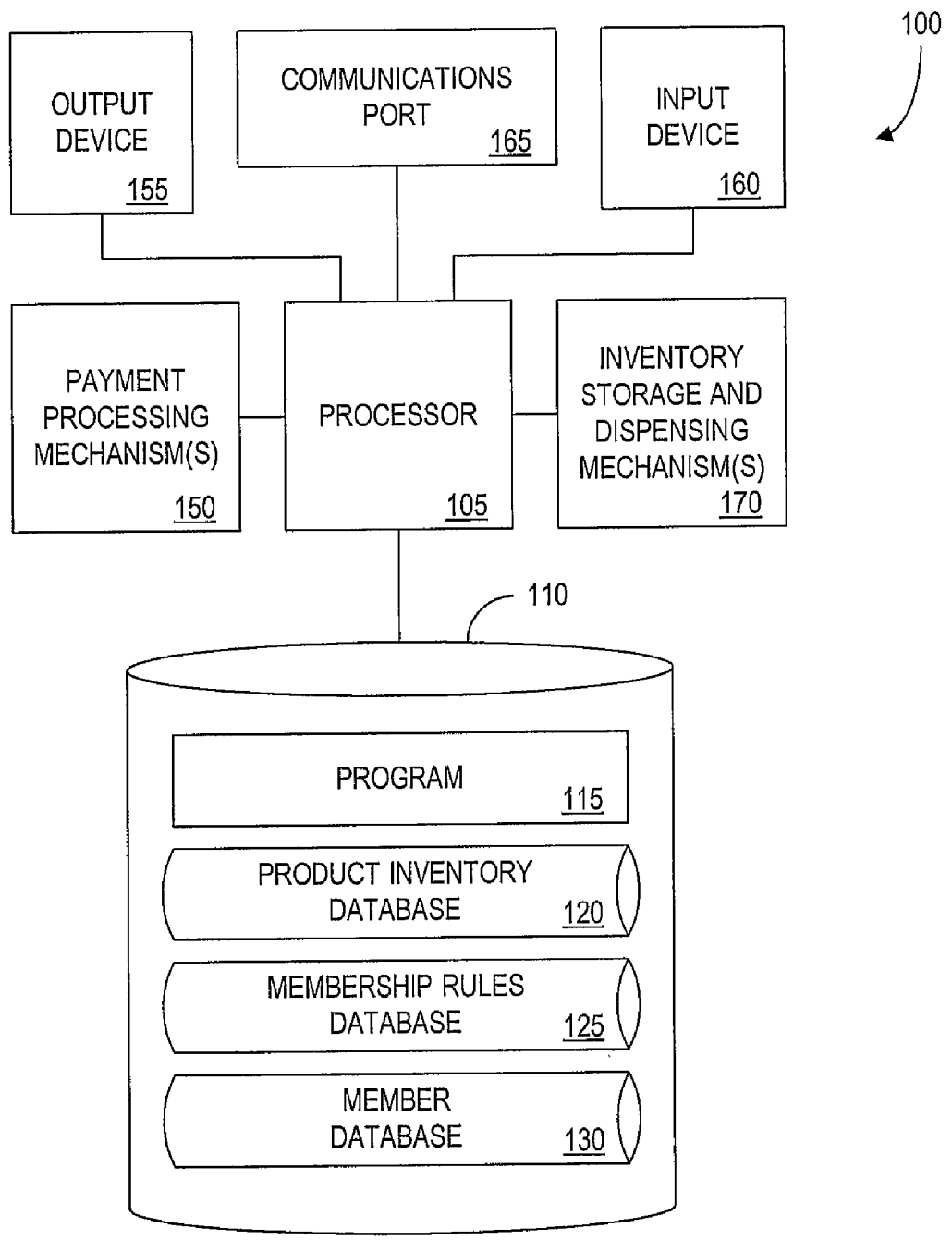
FIG. 1 is a block diagram of an embodiment of a vending machine.

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) embodiments of the disclosed invention(s)", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising", "having" and other grammatical forms thereof mean "including but not limited to", unless expressly specified otherwise.

The terms "a", "an" and "the" mean "one or more", unless expressly specified otherwise.

The term "plurality" means two or more, unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.
Disclosed Examples are not Limiting Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention which must be present in all embodiments.

Neither the Title (set forth at the beginning of the first page of this patent application) nor the Abstract (set forth at the end of this patent application) is to be taken as limiting in any way as the scope of the disclosed invention(s).

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.
Determination "Determining" something can be performed in a variety of manners and therefore the term "determining" (and like terms) includes calculating, computing, deriving, looking up (e.g., in a table, database or data structure), ascertaining and the like.
Computing It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" means any one or more microprocessors, central processing units (CPUs), computing devices, microcontrollers, digital signal processors, or like devices.

The term "computer-readable medium" refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications which claim the benefit of priority of the present application.

Definitions

Actual product velocity—The actual rate at which a particular product is sold by a vending machine during a period of time (e.g., during a sales period). The actual product velocity may be expressed in various units, such as units per time, dollars of sales per time, dollars of profit per time.

Dilution—The negative effect on profitability that ensues when a product is sold for a price lower than a given customer otherwise would have paid for the product. In some embodiments, promotion instances are constructed based on the potential for dilution, and, e.g., stored rules may account for such dilution. Thus, in some embodiments, vending machines may be programmed to reduce or eliminate the negative effects of dilution by selecting those promotion instances that are less likely to result in dilution, are more likely to result in less dilution or are otherwise likely to reduce the negative effects of dilution.

Fill Period, Sales Period—The period of time between restock dates and/or times.

Full Price, Retail Price—In some embodiments, the normal price charged for the purchase of one unit of a particular product.

Ideal product velocity, Target product velocity, Target velocity—A desired rate at which a particular product should be sold by a vending machine during a period of time (e.g., during a sales period). Thus, in some embodiments, an ideal product velocity may be set, calculated or otherwise determined for each product indicating the rate at which products must be sold in order to deplete the inventory to a certain level (e.g., to zero units remaining) by a predetermined time (e.g., by the end of a given sales period, by the next restocking event at the vending machine).

For example, an ideal product velocity may be calculated (e.g., by a vending machine control system) after an operator inputs a restock date and a desired remaining inventory for the date. For example, an operator may wish to have only one of each product remaining at the next restocking event so that the vending machine sells as many products as possible without completely selling out of any product, which could disappoint customers who wanted to purchase a product. Thus, in the preceding example, if an operator (a) stocks 50 units of Soda A, (b) inputs a restock date fourteen days away, and (c) indicates that only one unit of Soda A should remain at the restock date, the control system may divide 49 by 14 to conclude that, on average, 3.5 units must be sold per day within the sales period in order to achieve the ideal product velocity. An ideal product velocity may be updated, such as each day, in order to adjust to the desired inventory level of the product by the predetermined time.

As discussed herein, a vending machine or other device may (periodically, substantially continuously, or otherwise) determine whether or not actual product velocity is less than or equal to the ideal product velocity, and if not, may enable customers who present valid membership identifiers to receive associated benefits, such as discounts off one or more products' retail prices.

Operator—The owner of a vending machine (or the owner's employee, agent, etc). In an embodiment, an operator is a "route driver" or other service person that services one or more vending machines by restocking vending machines and/or removing or depositing currency in vending machines.

Member Customer, Member—A customer who has established a membership with a vending machine or group of vending machines.

Membership, Vending Machine Membership—A contractual or other relationship established between a customer of a vending machine and a vending machine operator, in which the customer may receive certain benefits provided by one or more vending machines.

Membership Identifier, Membership Number—A unique or substantially unique identifier used to identify (to a vending machine, an operator and/or a computer associated therewith) a member and/or a membership. In some embodiments, membership identifiers may be recorded on a token, such as a paper ticket, a plastic magnetic stripe card or a smart card. Membership identifiers may be representable as sequences of numeric digits or alphanumeric characters.

Product, Item—A good or service sold by or provided by a vending machine. Examples of goods sold by vending machines include beverages (e.g. cans of soda; bottles of water or iced tea) and snacks (e.g. candy bars; bags of chips). Examples of services sold by vending machines include car washes, photography services and access to digital content (e.g. permitting MP3 files or cellular telephone "ring tones" to be copied/downloaded to a handheld device such as a cellular telephone or an iPod™ media player).

Restock Date, Restock Time—The time and/or date that a vending machine is scheduled to be restocked by an operator (e.g. a route driver) of a vending machine.

User Device, Customer Device, Consumer Device—Any device owned or used by a customer, which is capable of accessing and/or displaying online and/or offline content. User devices may communicate with one or more vending machine servers or controllers, one or more vending machines, one or more peripheral devices, one or more third-party (e.g. retail store) servers, one or more user terminals, and/or other network nodes. In some embodiments, user devices may, for example, include gaming devices, personal computers, personal digital assistants, personal music players (e.g. an MP3 player), point-of-sale terminals, point of display terminals, kiosks, conventional telephones, cellular telephones, automated teller machines (ATMs), pagers, and combinations of such devices.

Disclosed embodiments include apparatus, systems and methods for establishing vending machine memberships. Also disclosed are apparatus, systems and methods for processing and facilitating vending machine transactions conducted pursuant to established vending machine memberships.

In an embodiment, a customer purchases a limited time membership, and is granted a membership identifier in return. The membership identifier enables the customer, during the limited time, to realize certain benefits and privileges at one or more vending machines. For example, in an embodiment, the provision or recognition of a valid membership identifier permits a customer to receive products (e.g. at the members request, up to two sodas per day), discounts (e.g. members may purchase items at wholesale prices or cost; only members may receive sale prices), and/or promotions (e.g. entries in a sweepstakes). By permitting customers to register as "members" and receive corresponding benefits, vending machine operators and product manufacturers can benefit from the ensuing increase in transaction volume.

I. Vending Machine Apparatus and System Architecture

Generally, a vending machine in accordance with various embodiments may comprise a device, or communicate with a device (e.g., a server, a peripheral device, and/or a peripheral device server) that is configured to manage sales transactions with customers by, among other things, receiving payment from customers, controlling the pricing and/or distribution of goods and/or controlling entitlements to services.

FIG. 1 is a block diagram of a vending machine 100 that may be operable to perform one or more functions as described herein.

The vending machine 100 may include a processor 105, such as one or more Intel® Pentium® or Centrino™ processors. The processor 105 (herein, "processor," "processor 105", "computer" or "control system") may include or be coupled to one or more clocks or timers (not pictured) and one or more communication ports 165 through which the processor 105 may communicate, in accordance with various embodiments, with other devices such as one or more peripheral device servers, one or more servers, one or more peripheral devices, and/or one or more user devices. In one or more embodiments, a communication port may comprise a modem (e.g. a cellular modem or otherwise), a wireless transmitter or transponder (e.g. an infrared transmitter/receiver, a radio transmitter/receiver). A communication port may include any practical means for transmitting and/or receiving data.

The processor 105 is also in communication with a data storage device 110. The data storage device 110 may include any practical data storage device, such as any appropriate combination of magnetic, optical and/or semiconductor memory. The data storage device may include, for example, additional processors, communication ports, Random Access Memory ("RAM"), Read-Only Memory ("ROM"), a compact disc and/or a hard disk. The processor 105 and the storage device 110 may each be, for example: (i) located entirely within a single computer or other computing device; or (ii) connected to each other by a remote communication medium, such as a serial port cable, a LAN, a telephone line, radio frequency transceiver, a fiber optic connection or the like. In some embodiments for example, the vending machine 100 may comprise one or more computers (or processors 105) that are connected to a remote server computer operative to maintain databases, where the data storage device 110 comprises the combination of the remote server computer and the associated databases.

The data storage device 110 stores a program 115 for controlling the processor 105. The processor 105 performs instructions of the program 115, and thereby operates in accordance with the disclosed embodiments, and particularly in accordance with the methods described in detail herein. Various embodiments include a computer program 115 developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers.

The program 115 may be stored in a compressed, uncompiled and/or encrypted format. The program 115 furthermore may include program elements that may be generally useful, such as an operating system, a database management system and device drivers for allowing the processor 105 to interface with computer peripheral devices. Appropriate general purpose program elements are known to those skilled in the art.

Further, the program 115 is operative to execute a number of invention-specific, objects, modules and/or subroutines, as disclosed herein. In general, the program may direct one or more processors in any practical manner. According to an embodiment of the present invention, the instructions of the program 115 may be read into a main memory of the processor 105 from another computer-readable medium, such as from a ROM to a RAM. Execution of sequences of the instructions in the program 115 causes processor 105 to perform the process steps described herein. As is known, hard-wired circuitry or integrated circuits may be used in place of, or in combination with, software instructions for implementation of the processes of various embodiments. Thus, the present invention is not limited to any specific combination of hardware, firmware, and/or software.

In addition to the program 115, the storage device 110 is also operative to store one or more databases. Various forms of computer readable media may be involved in carrying one or more sequences of one or more instructions to a processor for execution.

Vending machine 100 may comprise one or more payment processing mechanisms 150. Each payment processing mechanism may comprise one or more mechanisms for receiving payment and dispensing change, including a coin acceptor, a bill validator, a card reader (e.g. a magnetic stripe reader) and a change dispenser.

In any of various manners that are known in the art, a magnetic stripe card reader may read data on the magnetic stripe of a credit or debit card. Such a card reader may cooperate with conventional point-of-sale credit card processing equipment to validate card-based purchases in a known manner through a conventional transaction authorization network. Suitable card-based transaction processing systems and methods are available from, e.g., USA Technologies, Inc., of Malvern, Pa.

The coin acceptor, bill validator and change dispenser may communicate with a currency storage apparatus (a "hopper"; not shown) and may comprise conventional devices such as models AE-2400, MC5000, TRC200 by Mars, Inc. of West Chester, Pa., or CoinCo model 9300-L.

As is known, the coin acceptor and bill validator may receive and validate currency that is stored by the currency storage apparatus. Further, a bill validator or coin acceptor may be capable of monitoring stored currency and maintaining a running total of the stored currency, as is discussed with reference to U.S. Pat. No. 4,587,984, entitled COIN TUBE MONITOR MEANS, the entirety of which is incorporated by reference herein. The change dispenser activates the return of coinage to the customer where appropriate.

In an embodiment, a vending machine may be operable to receive payment authorization and product selection commands through a wireless device communication network, directly or indirectly, from a customer device (e.g. a cellular telephone). In such an embodiment, a payment processing mechanism may comprise a cellular transceiver operatively connected to a processor. Systems and methods allowing for the selection of and payment for vending machine articles through cellular telephones are provided by USA Technologies, Inc. Further, in such an embodiment, a customer cellular telephone may serve as an input/output device, as described herein.

Further details concerning vending machine payment processing mechanisms are well known in the art.

The vending machine 100 may further comprise an output device 155 and an input device 160. Although only a single representation of an output device 155 and a single representation of an input device 160 is illustrated in FIG. 1, any number of output devices and/or input devices may be used.

In accordance with an embodiment, a vending machine may include an input device for receiving input from a customer, operator, or other person. Also, a vending machine may include one or more output devices for outputting product and/or other information to a customer or operator. It will be readily understood that various combinations of input and output devices may be employed in accordance with various embodiments. For example, in embodiments which feature touch screens (described herein), both input and output functionality may be provided by a single touch screen device.

A vending machine may include more than one input device. For example, a vending machine may include an exterior input device for receiving customer input and an interior input device for receiving operator input. In some embodiments, however, the input device can receive input data from other entities besides customers, such as receiving input data from both operators and customers.

A vending machine may comprise more than one output device. For example, a vending machine may include both a Liquid Crystal Display (LCD) screen and several Light Emitting Diodes (LEDs). Output device 155 may comprise, for example, an LCD and/or one or more LEDs displays (e.g., several alphanumeric LEDs on the shelves of a vending machine, each LED being associated with a row of product inventory).

In one embodiment, an LED display screen may be mounted atop a vending machine (e.g., attached thereto, such as via bolts or other conventional mounting hardware). Such a mounted LED display screen and may be used to communicate messages (described herein) to customers. A suitable LED display screen for such an embodiment may be housed in an aluminum case having a length of 27.5", a height of 4.25", and a depth of 1.75". Such a display screen may have a display area capable of showing 13 alphanumeric and/or graphical characters. Further, such an LED display screen may comprise a serial computer interface, such as an RJ45/RS232 connector, for communicating with a processor, as described herein. Further still, such an LED display may be capable of outputting text and graphics in several colors (e.g., red, yellow, green).

In an embodiment, an output device comprises a printer. In one embodiment, a printer is configured to print on card stock paper (e.g. 0.06 mm to 0.15 mm thickness), such as the EPSON EU-T400 Series Kiosk Printer. Further, a printer may be capable of thermal line printing of various alphanumeric and graphical symbols in various font sizes (e.g. raging from 9 to 24 point) on various types of paper. Additionally, such a printer may communicate with a processor (described herein) via an RS232/IEEE 12834 and/or bi-directional parallel connection. Such a printer may further comprise a 4 KB data buffer.

In an embodiment, an output device comprises an audio module, such as an audio speaker, that outputs information to customers audibly. Speakers may comprise conventional speakers or modern hypersonic speakers.

Various input devices will be apparent based on the present disclosure. Input device 160 may include (1) a set of alphanumeric keys for providing input to the vending machine, such as the Programmable Master Menu® Keypad, (2) a selector dial, (3) a set of buttons associated with a respective set of item dispensers, (4) a motion sensor, (5) a barcode reader, (6) a Dual-Tone Multi-Frequency (DTMF) receiver/decoder, (7) a wireless device (e.g. a cellular telephone or wireless Personal Digital Assistant), (8) cameras, such as digital video and/or digital still photographic cameras, (9) a voice recognition module, (10) a fingerprint reader, (11) a topical facial pattern scanner/reader, (12) an iris or retinal scanner, (13) a microphone, (14) an infrared receiver, and/or (15) any other device capable of receiving a command from a user and/or transmitting a command to a processor.

In an embodiment, a touch-sensitive screen may be employed to perform both input and output functions. Suitable, commercially available touch screens for use in accordance with the present invention include those manufactured by Elo TouchSystems, Inc., of Fremont, Calif., such as Elo's AccuTouch series touch screens. Such touch screens may comprise: (i) a first (e.g., outer-most) hard-surface screen layer coated with an anti-glare finish, (ii) a second screen layer coated with a transparent-conductive coating, (iii) a third screen layer comprising a glass substrate with a uniform-conductive coating. Further, such touch screens may be configured to detect input within a determined positional accuracy, such as a standard deviation of error less than ±0.080-inch (2 mm). The sensitivity resolution of such touch screens may be more than 100,000 touchpoints/in$^2$ (15,500 touchpoints/cm$^2$) for a 13-inch touch screen. For such touch screens, the touch activation force required to trigger an input signal to the processor (described herein) via the touch screen is typically 2 to 4 ounces (57 to 113 g). Additionally, touch screens for use in accordance with embodiments of the present invention may be resistant to environmental stressors such as water, humidity, chemicals, electrostatic energy, and the like. These and other operational details of touch screens (e.g., drive current, signal current, capacitance, open circuit resistance, closed circuit resistance, etc.) are well known in the art.

Vending machine 100 may further comprise one or more inventory storage and dispensing mechanism(s) 170. Product inventory storage and product dispensing functions of a vending machine configured in accordance with a snack machine embodiment may include one or more of: (i) a drive motor, (ii) metal shelves, (iii) a product delivery system (e.g. a chute, product tray, product tray door, etc.), (iv) dual spiral (i.e. double helix) item dispensing rods, (v) convertible (i.e. extendable) shelves, and/or (vi) a refrigeration unit. Various inventory storage and dispensing mechanisms are well known.

In an embodiment, a vending machine may be housed in a casing of the model 129 SnackShop manufactured by Automatic Products™. In such an embodiment, three removable shelves may be employed, together providing for 30 product rows and an inventory capacity of between 185 to 522 commonly vended snack products.

Inventory storage and dispensing mechanism(s) 170 may comprise: (i) metal and/or plastic shelving, (ii) item dispensing actuators/motors, (iii) product delivery chutes, and/or (iv) a refrigeration unit. Further details concerning vending machine inventory storage and dispensing mechanisms are well known in the art.

Figure 2A:
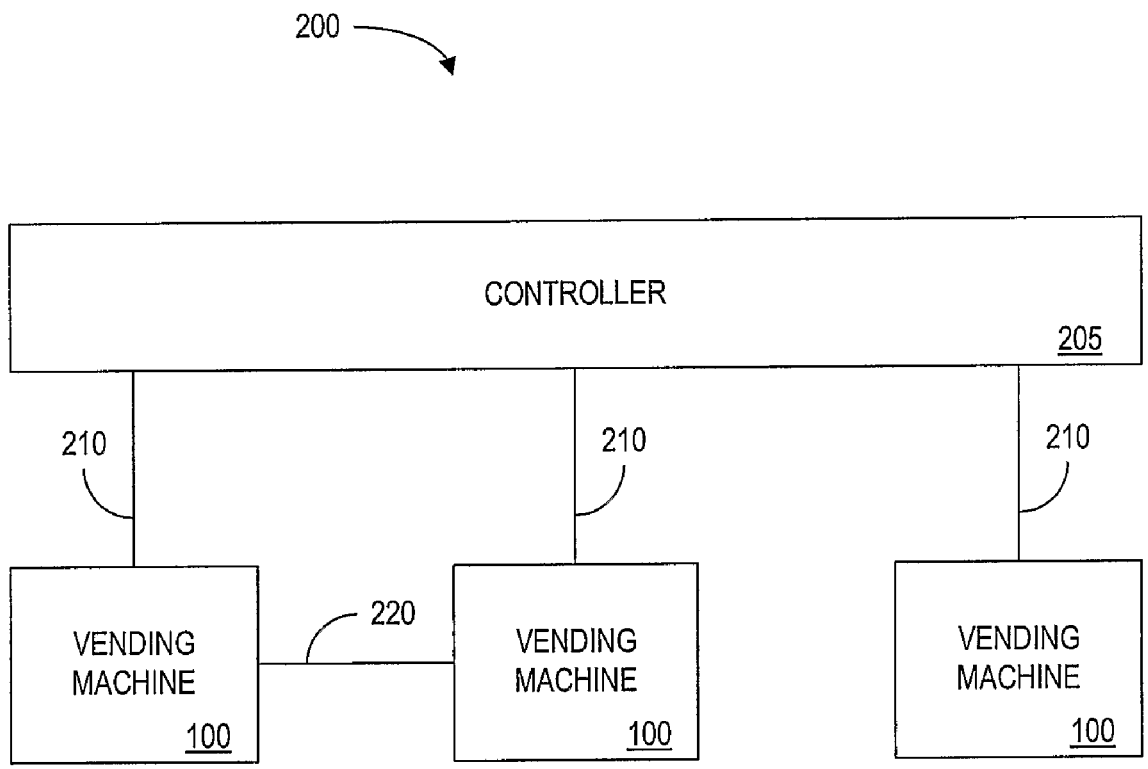
FIG. 2A is a block diagram of an embodiment of a system.

FIG. 2A is a block diagram of a system 200 which includes a controller 205 that is in communication, via a communications network 210, with one or more vending machines 100.

The controller 205 may communicate with the vending machines 100 (directly or indirectly) via a wired or wireless medium, such as the Internet, LAN, WAN or Ethernet, Token Ring, or via any appropriate communications means or combination of communications means.

Each of the vending machines 100 may comprise computers, such as those based on the Intel® Pentium® or Centrino™ processor, that are adapted to communicate with the controller 205. Further, in some embodiments, a controller 205 may comprise one or more computers, such as those based on the Intel® Pentium® processor, that may or may not be located remotely to one another or remotely to one or more of the vending machines 100. Thus, in some embodiments, a controller 205 may facilitate the transmission of data between one or more vending machines 100 and one or more operator computers so that human operators may remotely interact with vending machines and/or vending machine customers. Further still, in some embodiments, system 200 includes a user device that enables customers to transmit data to and/or receive data from a vending machine 100 and/or controller 205.

Any number and type of vending machines 100 may be in communication with the controller 205. Communication between the vending machines 100 and the controller 205, and among the vending machines 100 (which communicate via communication network 220), may be direct or indirect, such as over the Internet through a Web site maintained by controller 205 on a remote server or over an on-line data network including commercial on-line service providers, bulletin board systems and the like. In yet other embodiments, the vending machines 100 may communicate with one another and/or controller 205 over RF, cable TV, satellite links and the like.

In an embodiment, communication networks that may be included in network 210 and/or network 220, or that may be otherwise included as part of system 200, include: a local area network (LAN), a wide area network (WAN), the Internet, a telephone line, a cable line, a radio channel, an optical communications line, a satellite communications link. Possible communications protocols that may be part of system 200 include: Ethernet (or IEEE 802.3), SAP, ATP, Bluetooth™, and TCP/IP. Communication may be encrypted to ensure privacy and prevent fraud in any of a variety of ways well known in the art.

In an embodiment, the controller 205 need not be employed. For example, according to an embodiment, a stand-alone vending machine 100 or a vending machine 100 in communication with one or more other vending machines 100 may be employed without the controller 205. Accordingly, any functions described as performed by the controller 205 and any data described as stored on the controller 205 may instead be performed by or stored on one or more vending machines 100 in various embodiments.

Similarly, in an embodiment consistent with FIG. 2, some of the functionality described with reference to FIG. 1 as being performed by vending machine 100 may instead or in addition be performed by controller 205. Similarly, any data described with reference to FIG. 1 as being stored in a memory of vending machine 100 may, in an embodiment consistent with FIG. 2, be instead or in addition stored in a memory of controller 205.

Figure 2B:
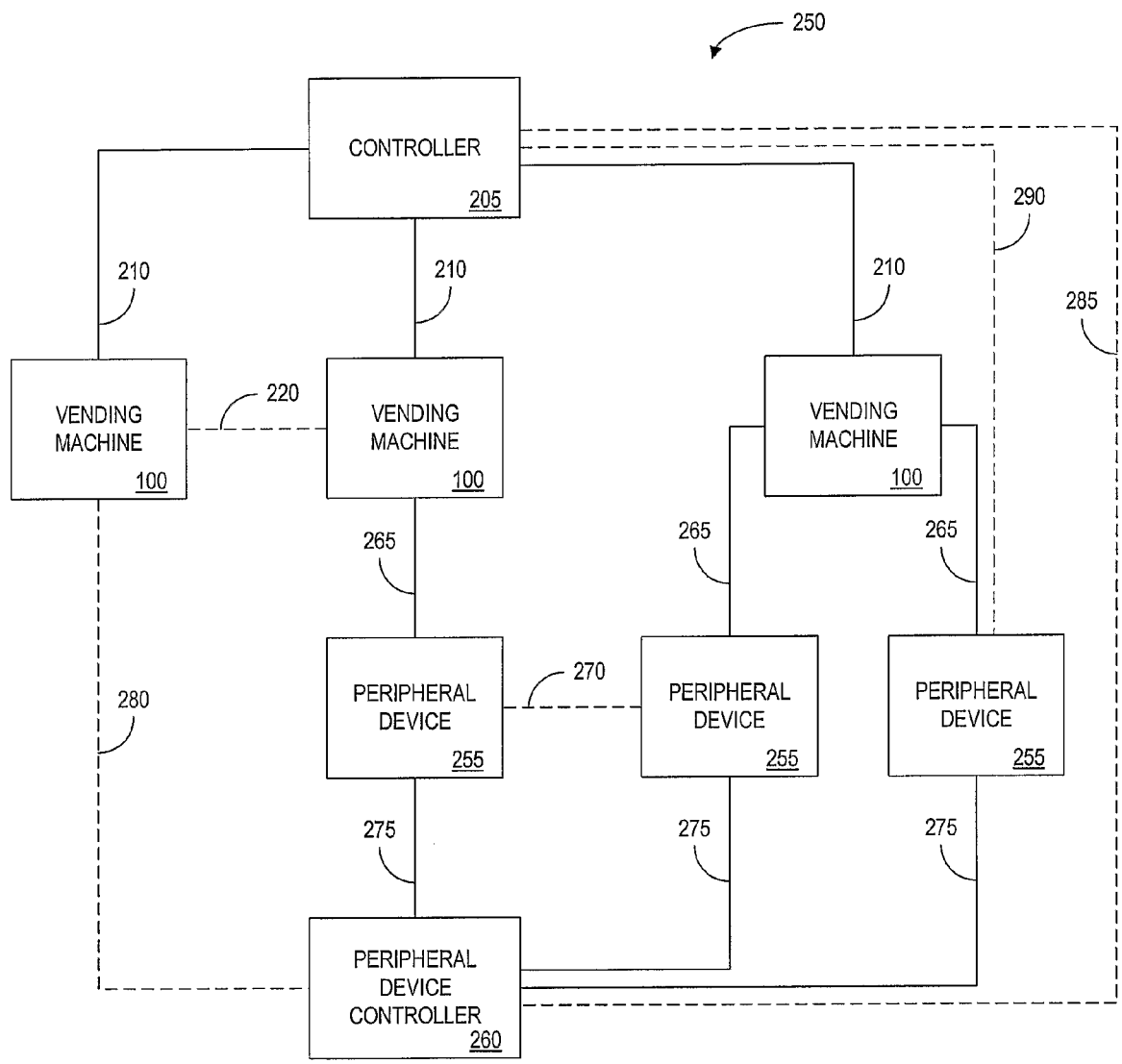
FIG. 2B is a block diagram of an embodiment of a system.

FIG. 2B is a block diagram of a system 250 according to an embodiment which includes a controller 205 that is in communication, via a communications network 210, with one or more vending machines 100. A difference between system 200 (FIG. 2A) and system 250 (FIG. 2B) is that in system 250 at least one vending machine 100 is also in communication with one or more peripheral devices 255 (defined above). A peripheral device 255 may, in turn, be in communication with a peripheral device controller 260 (e.g., via communication network 275). In some embodiments, a peripheral device 255 may also or instead be in communication with controller 205 (e.g., via communication network 290), one or more vending machines 100 (via communication network 265), and/or one or more user devices (not shown). In an embodiment the peripheral device controller 260 may be in communication with one or more vending machines 100 (via communication network 280), controller 205 (via communication network 285), and/or user device.

Any number of vending machines 100 may be in communication with the controller 205. Any number and type of peripheral devices 255 may be in communication with a vending machine 100, peripheral device controller 260 and controller 205.

Any of the controller 205, the vending machines 100, the peripheral devices 255 and/or the peripheral device server 260 may communicate with one another directly or indirectly, via a wired or wireless medium such as the Internet, LAN, WAN or Ethernet, Token Ring, or via any appropriate communications means or combination of communications means. For example, the controller 205 may communicate directly with one of the vending machines 100 (e.g., via a LAN) and indirectly (e.g., via a vending machines 100) with a peripheral device 255. In another example, the controller 205 may communicate with one of the vending machines 100 via a LAN and with another of the vending machines 100 via the Internet.

Any and all of the controller 205, the vending machines 100, the peripheral devices 255 and the peripheral device controller 260 may comprise computers, such as those based on the Intel® Pentium® or Centrino™ processor. Further, in an embodiment, each of the peripheral devices 255 may comprise an external or internal module associated with one or more of the vending machines 100 that is capable of communicating with one or more of the vending machines 100 and of directing the one or more vending machines 100 to perform one or more functions.

Communication between any of the controller 205, the vending machines 100, the peripheral devices 255 and the peripheral device controller 260, among the vending machines 100 and among the peripheral devices 255 may be direct or indirect, such as over the Internet through a Web site maintained by controller 205 on a remote server or over an on-line data network including commercial on-line service providers, bulletin board systems and the like. Any and all of controller 205, the vending machines 100, the peripheral devices 255 and the peripheral device controller 260 may communicate with one another over various media, including RF, cable TV, satellite links and the like.

Some, but not all, possible communication networks that may comprise any or all of the network 210, 220, 265, 270, 275, 280, 285 and 290, or that otherwise may be part of system 250 include: a local area network (LAN), a wide area network (WAN), the Internet, a telephone line, a cable line, a radio channel, an optical communications line, a satellite communications link. Possible communications protocols that may be part of system 250 include: Ethernet (or IEEE 802.3), SAP, ATP, Bluetooth™, and TCP/IP. Communication may be encrypted to ensure privacy and prevent fraud in any of a variety of ways well known in the art.

Figure 2C:
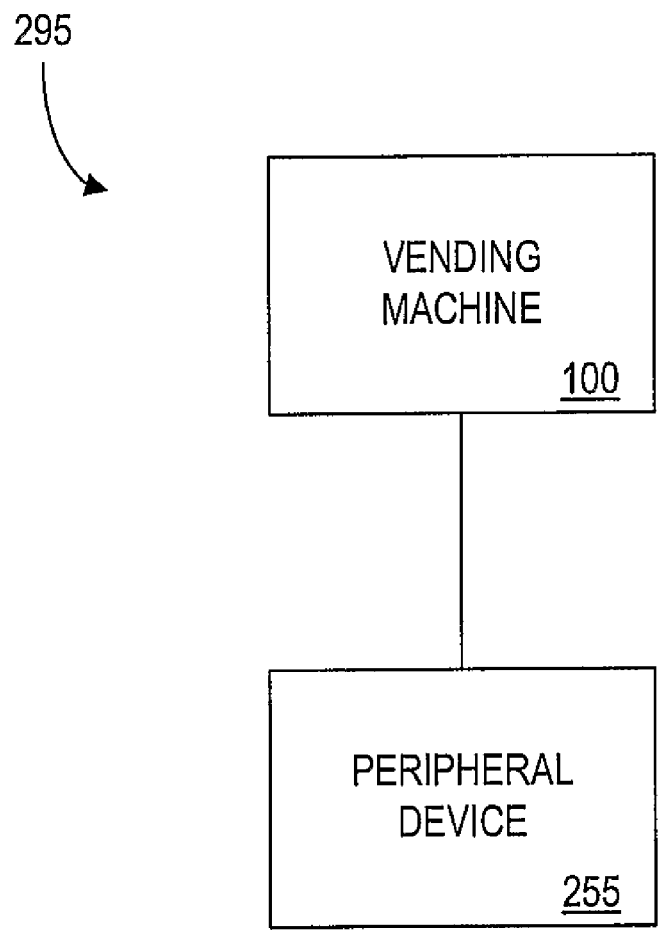
FIG. 2C is a block diagram of an embodiment of a system.

As described above, the controller 205 need not be employed. For example, in one an embodiment, a stand-alone vending machine 100, one or more vending machines 100 in communication with one or more peripheral devices 255 (as illustrated in FIG. 2C), one or more vending machines 100 in communication with peripheral device controller 260, one or more peripheral devices 255 in communication with peripheral device controller 260, and/or a vending machine 100 in communication with one or more other vending machines 100 may be employed without a controller. In such embodiments, any functions described as performed by a particular device (e.g., by a vending machine 100) or data described as stored in a memory of a particular device (e.g., in a memory of a vending machine 100) may instead or in addition be performed by or stored in another of the devices described herein (e.g., a peripheral device 255).

Similarly, in various embodiments peripheral device controller 260 need not be employed. In embodiments that do not involve peripheral device controller 260, any or all of the functions described herein as being performed by peripheral device controller 260 may instead be performed by controller 205, one or more vending machines 100, one or more peripheral devices 255, or a combination thereof. Similarly, in embodiments that do not involve peripheral device controller 260 any data described herein as being stored in a memory of peripheral device controller 260 may instead be stored in a memory of controller 205, one or more vending machines 100, one or more peripheral devices 255, or a combination thereof.

Any or all of the vending machines 100 may, respectively, include or be in communication with a peripheral device 255. A peripheral device 255 may be a device that obtains (e.g., receives or reads) information from (and/or transmits information to) one or more vending machines 100. For example, a peripheral device 255 may be operable to obtain information about transactions being conducted at a vending machine 100, such as the initiation of a transaction, an amount of money deposited for a transaction and/or a product selected during a transaction. For example, a peripheral device 255 may monitor activities carried out by a processor of a vending machine 100.

In one or more embodiments, one or more such peripheral devices 255 may be in communication with a peripheral device controller 260. This allows the peripheral device controller 260 to receive information regarding a plurality of transactions conducted at a plurality of vending machines 100. The peripheral device controller 260, in turn, may be in communication with the controller 205. It should be understood that any functions described herein as performed by a peripheral device 255 may also or instead be performed by the peripheral device controller 260. Similarly, any data described herein as being stored on or accessed by a peripheral device 255 may also or instead be stored on or accessed by the peripheral device controller 260.

An example of a peripheral device that may comprise a peripheral device 255 is the e-Port™ by USA Technologies Inc. The e-Port™ is a credit and smart card-accepting unit that controls access to office and MDB vending equipment, and serves as a point of purchase credit card transaction device. The e-Port™ includes an LCD that allows for the display of color graphics, and a touch sensitive input device (touch screen) that allows users to input data to the device. The display may be used to prompt users interactively with, e.g., promotions and information about their transaction status.

A peripheral device 255 may be operable to receive input from customers, receive payment from customers, exchange information with a remotely located server (e.g., controller 205 and/or peripheral device controller 260) and/or display messages to customers. A peripheral device 255 may be operable to instruct a vending machine 100 that appropriate payment has been received (e.g., via a credit card read by the separate device) and/or that a particular product should be dispensed by the vending machine. Further, a peripheral device 255 may be operable to instruct the vending machine to execute process steps and/or output messages.

The functions described herein as being performed by a peripheral device controller 260 and/or a peripheral device 255 may, in one or more embodiments, be performed by the controller 205 (in lieu of or in conjunction with being performed by a peripheral device controller 260 and/or a peripheral device 255). Such functions may be performed by controller 205 in either system 200 (FIG. 2A) or system 250 (FIG. 2B).

In one or more embodiments, a peripheral device 255 may be useful for implementing various embodiments into the operation of a conventional vending machine. For example, in order to avoid or minimize the necessity of modifying or replacing a program already stored in a memory of a conventional vending machine, an external or internal module that comprises a peripheral device 255 may be operatively coupled to, inserted into or otherwise associated with the vending machine. For example, a conventional vending machine may be retrofitted with a peripheral device 255 that is appropriately programmed to implement various embodiments.

A peripheral device 255 may include (i) a communications port (e.g., for communicating with one or more vending machines 100, peripheral device controller 260, another peripheral device 255, and/or controller 205); (ii) a display (e.g., for graphics and/or text associated with a promotion), (iii) another output means (e.g., a speaker, light, or motion device to communicate with a customer), and/or (iv) a benefit providing means (e.g., a printer and paper dispensing means).

In an embodiment, the peripheral device 255 may direct a vending machine to perform various functions, even those described herein as being directed by other components or devices. For example, a program stored in a memory of peripheral device 255 may cause a processor of a vending machine 100 to perform certain functions. For example, a program stored in a memory of peripheral device 255 may cause a processor of a vending machine to dispense one or more products, dispense a monetary amount, refrain from dispensing a monetary amount, refrain from outputting a product, and/or communicate with another device.

In an embodiment, a vending machine 100 and a peripheral device 255 that is associated with the vending machine 100 may not communicate with one another at all. In some embodiments, however, each may communicate with a computer or other device. For example, a vending machine 100 may communicate with controller 205 and an associated peripheral device 255 may communicate with peripheral device controller 260 and/or controller 205. For example, if both vending machine 100 and peripheral device 255 are in communication with a controller 205 or other intermediary, each may obtain information associated with the other through the controller 205 or other intermediary.

In either the system 200 (FIG. 2A) or the system 250 (FIG. 2B), the controller 205 and/or the peripheral device controller 260 may be accessible, directly or indirectly, via another computer (communicating, e.g., over the Internet or other network) by a customer or another entity. Accordingly, a customer or other entity (e.g., an owner of the vending machine) of the other computer could communicate with the controller 205 and/or peripheral device controller 260 via a Web browser. The other computer could, e.g., receive from the controller 205 and/or peripheral device controller 260 messages described herein as being output by the vending machine or peripheral device, and/or transmit to the controller 205 and/or peripheral device controller 260 input described herein as being provided to the vending machine. Similarly, various data described herein as received through an input device of a vending machine 100 and/or peripheral device 255 may be received through a Web browser communicating with the controller 205 and/or peripheral device controller 260, which in turn communicates with the vending machine 100. Thus, an operator of the vending machine may have remote polling and reporting capabilities (e.g. remote access to vending machine databases and diagnostics), may be able to transmit instructions and/or commands to the vending machine 100, may be able to communicate with vending machine customers of vending machine 100 (via vending machine 100's input and output devices), and the like.

FIG. 2C is a block diagram of another system 295 which includes a vending machine 100 that is in communication with a peripheral device 255. As described above, a prior art vending machine 100 may be retrofitted with a peripheral device 255. The peripheral device 255 may be operable to perform various methods and/or to direct the vending machine 100 to perform various methods, without requiring a controller 205 and/or a peripheral device controller 260. In one or more embodiments, the vending machine 100 and/or the peripheral device 255 may be accessible from a remote location via a communication port.

Figure 3:
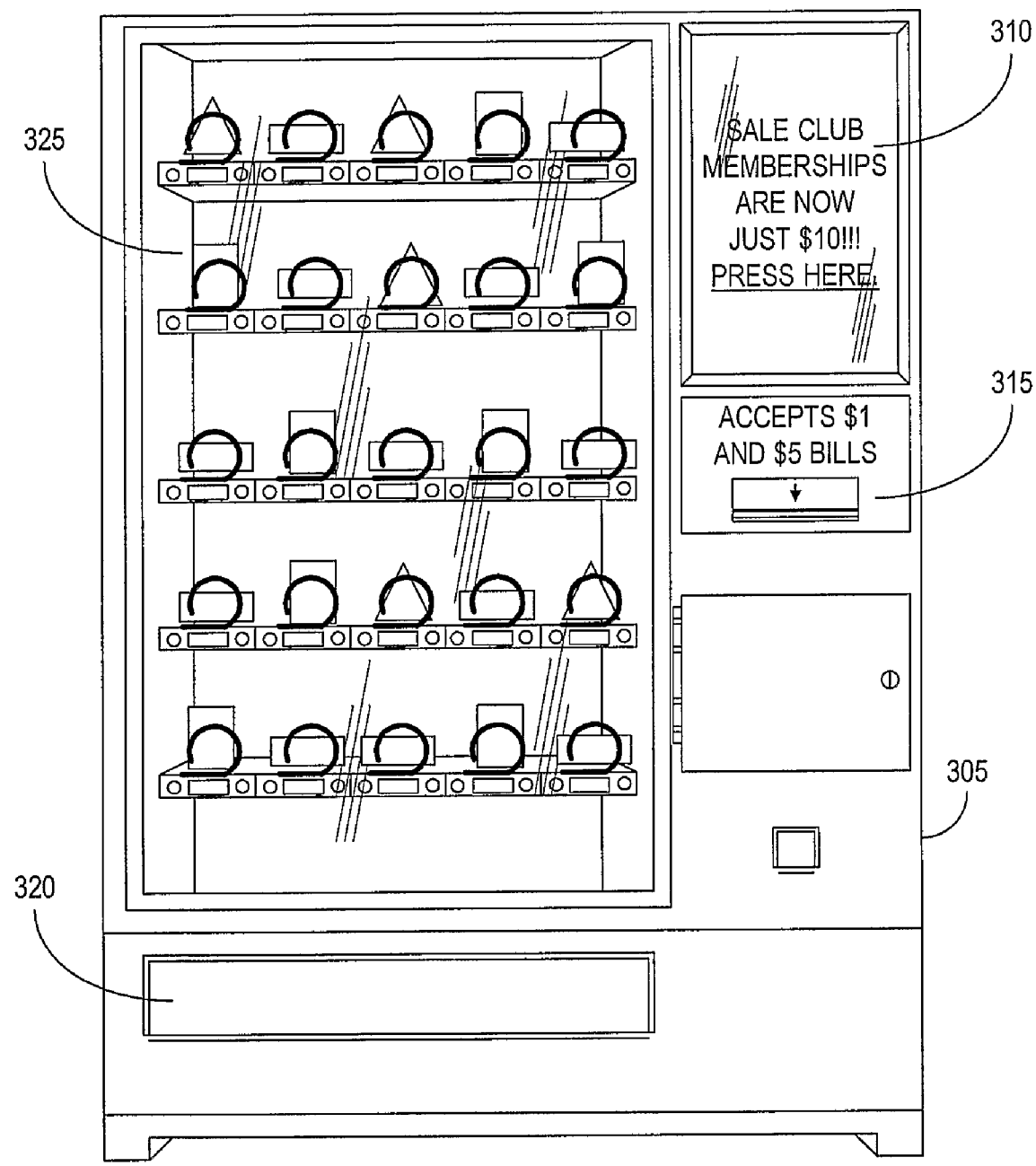
FIG. 3 is a diagram illustrating an example of the external appearance of a vending machine.

FIG. 3 is a diagram of an embodiment 300 of the external appearance of an exemplary vending machine 100. The embodiment 300 includes (i) a cabinet 305, (ii) an input/output device 310 for receiving information from a customer and/or outputting text and/or graphical information to a customer, (iii) a payment processing mechanism 315, (iv) an inventory dispensing mechanism 320, and (iv) a product display window 325 behind which are visible the products available for sale from the vending machine and the product storage mechanism that holds the products within the vending machine.

Cabinet 305 may be constructed from, for example, any combination of (1) commercial grade (e.g., sixteen-gauge) steel (e.g., for exterior panels and internal shelving), (2) transparent materials such as glass or Plexiglas (e.g., for product display window 325), (3) rubber (e.g., for waterproofing insulation), (4) plastic, (5) aluminum, and/or (6) any suitable material.

Many commercially available machine cabinets can be modified to work in accordance with the present invention. For example, in snack machine embodiments, a suitable machine casing may comprise the 129 SnackShop™ manufactured by Automatic Products International, Ltd.™ of Saint Paul, Minn., which stands at 72"/1829 mm wide, has a width of 38⅞"/988 mm, and a depth of 35"/889 mm. Other suitable snack machine casings include the A La Carte™ machine from Automatic Products™ and the GPL SnackVendor™ model #159 from Crane Merchandising Systems/Crane Co.™ of Stamford, Conn.

In beverage machine embodiments, machine cabinets commercially available from Dixie Narco™ Inc. of Williston, S.C. may be employed. Beverage machine cabinets may comprise a "cooler" or "glass front" style front panel, featuring a transparent front panel (e.g. glass) enabling customers to see inventory for sale. Alternatively, beverage machine casings may comprise a "bubble front" style front panel, featuring a decorative front panel, typically used to advertise a logo of a product manufacturer commercially interested in the vending machine's operation.

Other embodiments are contemplated as well, including combination snack and beverage vending machine embodiments, such as those available from Crain Co.™. Further details concerning the suitability of machine casing/cabinetry are well known in the art.

It should be noted that payment processing mechanism 315 may comprise any or all of the components described with reference to payment processing mechanism 150 (FIG. 1). Similarly, product dispensing mechanism 320 may comprise any or all of the components suitable for dispensing products described above with reference to inventory storage and dispensing mechanism 170 (FIG. 1).

II. Processes

Various disclosed embodiments facilitate the establishment of vending machine memberships, as well as the processing of vending machine transactions conducted pursuant to such established vending machine memberships. Below are described an example Membership Registration process and an example Transaction process. These two example processes are provided for purposes of illustration and, like all embodiments disclosed herein, are not limiting on the scope of any disclosed invention.

Membership Registration Process

In an embodiment, a customer purchases a limited time membership, and in return the customer is granted a membership identifier. The membership identifier enables the customer, during the limited time, to realize certain benefits and privileges at the vending machine. For example, in one or more embodiments, a valid membership identifier permits a customer to receive products (e.g. twelve snack items, up to two sodas per day), discounts (e.g. members may purchase items at wholesale prices or cost; only members may receive sale prices), promotions (e.g. sweepstakes entries) and/or access to other vending machine functionality (e.g., the ability to use a fingerprint or other biometric identifier to identify the customer to the vending machine).

Figure 7:
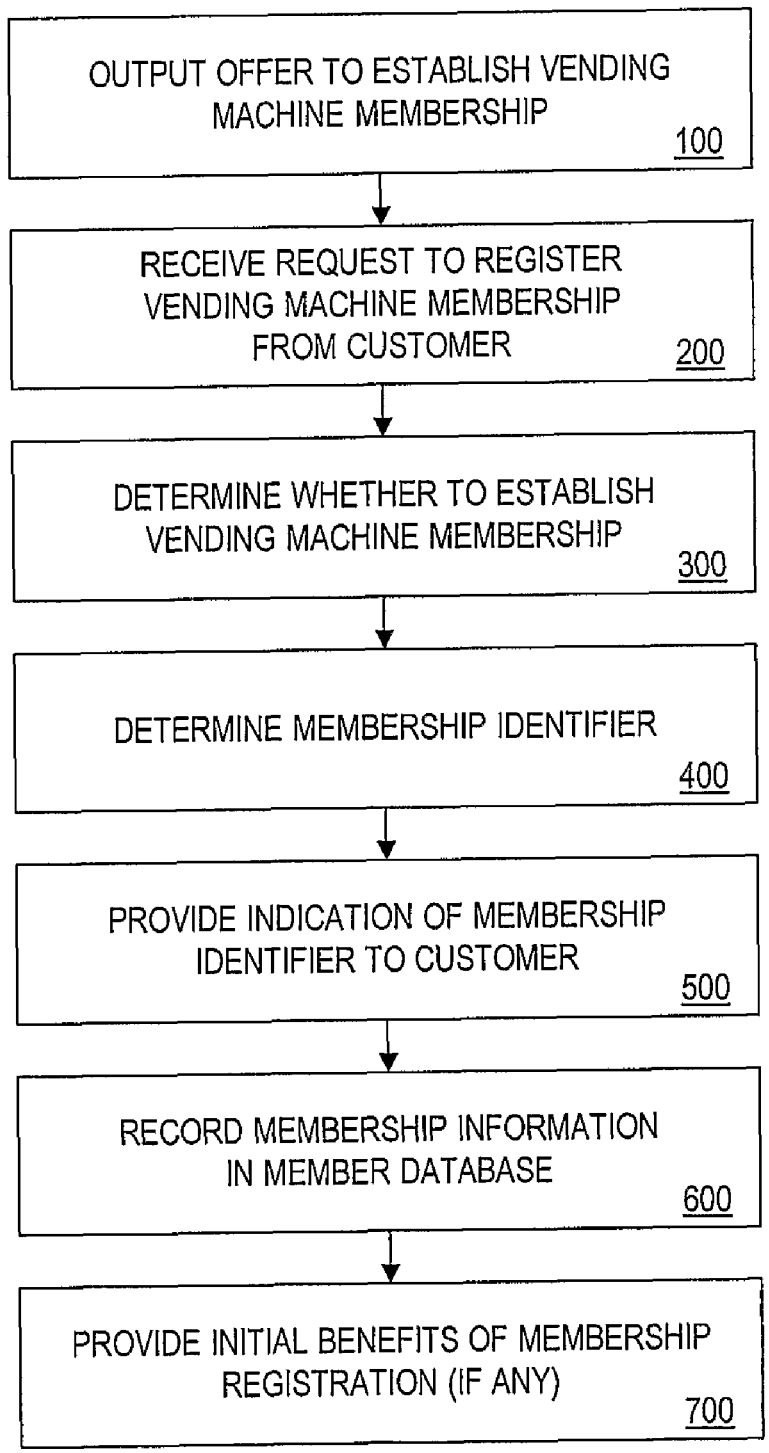
FIG. 7 is a flow diagram illustrating an embodiment of a membership registration process.

FIG. 7 is a flow diagram according to an embodiment of a membership registration process, described immediately below:

Step 100: Provide an Offer to Establish Vending Machine Membership

At Step 100, a vending machine 100, a controller 205 and/or an operator provides the customer with an offer to establish a vending machine membership.

In one embodiment, the membership offer may be provided through a sign (e.g. static signage, signage painted on machine cabinetry or overlaid on product display window 325). For example, a sign may read "Become a member and get access to special sales! One year 'sale club' memberships are now just $10".

In an embodiment, the membership offer may be output in various forms via an output device, such as an output device 155 of a vending machine 100. In an embodiment, the membership offer may be output via an output device of a user device (e.g. an LCD screen of a cellular telephone; the monitor of a personal computer). Thus, in some embodiments, memberships may be offered via the telephone or via the Internet. Further, in some embodiments, the content of an offer may be retrieved from a membership rules database 125 or from other stored data.

In an embodiment, a vending machine 100, a controller 205 and/or an operator may determine a membership offer dynamically (e.g., in response to market forces or other inputs). For example, one or more terms of a membership offer may be determined based on measured demand for one or more products, and/or supply of one or more products. For example, if actual product velocity for one or more products is less than a certain threshold (e.g. if actual product velocity for a product is less than ideal product velocity), a membership offer may be constructed and output, in which the membership offer permits a customer to receive one or more products (e.g., the product with the less than ideal actual product velocity) at a discount price for a period of time. Actual product velocity can be reflected in a product inventory database 120 or other data storage mechanism.

Figure 4A:
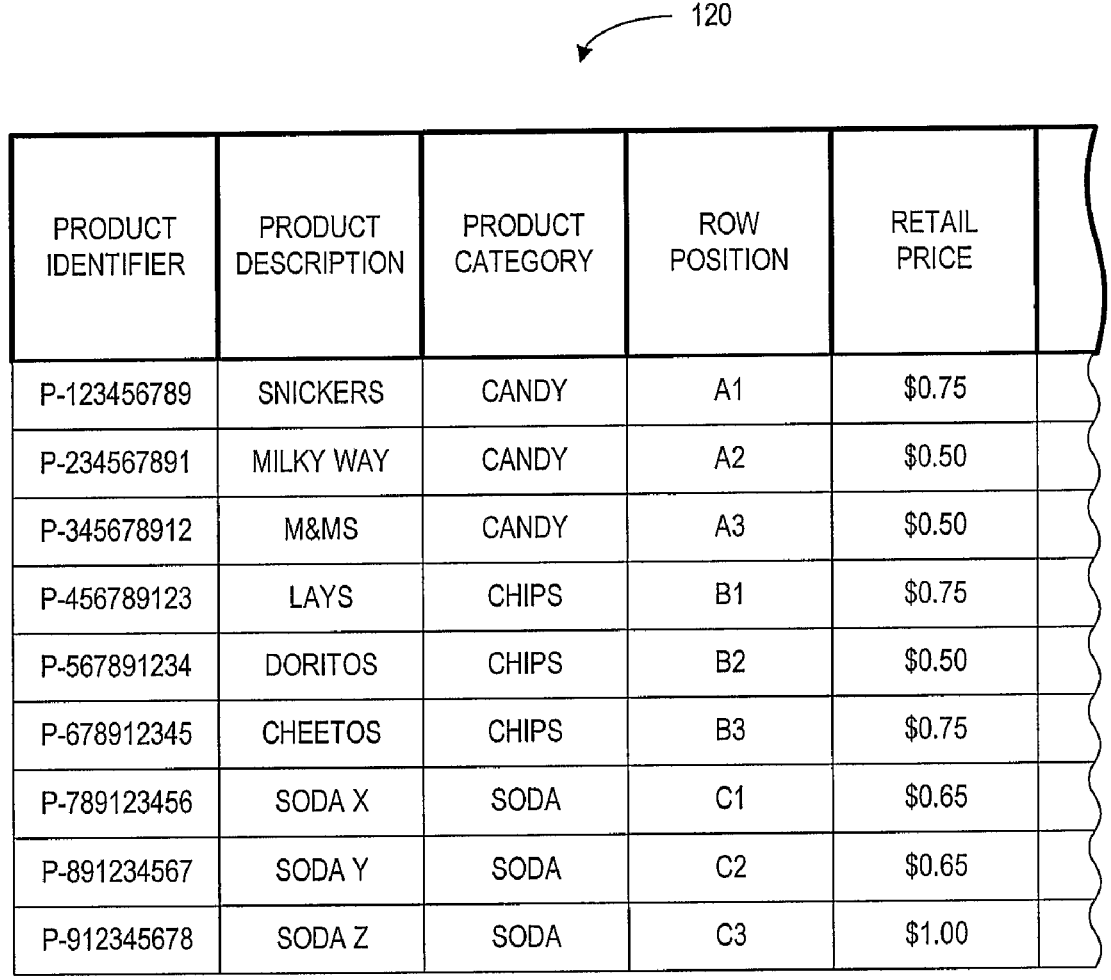

In an embodiment, rules for the dynamic construction of terms of membership offers may be determined in accordance with entries stored in a membership rules database 125. For example, with respect to the first record of the membership rules database 125 of FIG. 5, that example provides that an offer for a "cost club card" type membership is to be output to customers when the average actual product velocity (for all the inventoried products) is less than half of the average ideal actual product velocity (for all the inventoried products). The data illustrated in the exemplary product inventory database 120 of FIGS. 4A and 4B provides that the average actual product velocity for all the inventory products is less than half of the average ideal product velocity for all the inventoried products. Accordingly, a membership offer may be output to one or more customers via an output device 155 and/or a user device, the offer reading "For just $30, you can join our cost club card and get all items at wholesale prices!"

By way of another example, the second record of the membership rules database 125 of FIG. 5 provides that a "sale price club card" type membership is to be output to one or more customers when the average actual product velocity (for all the inventoried products) is less than the ideal average actual product velocity (for all the inventoried products). The data illustrated in the exemplary product inventory database 120 of FIGS. 4A and 4B provides that the average actual product velocity for all the inventory products is less than the ideal average product velocity for all the inventoried products. Accordingly, a membership offer may be output to one or more customers via an output device 155 and/or a user device, the offer reading "For just $10, you can get access to great sales throughout the year!" As discussed herein, in one or more embodiments, a customer purchasing such a membership may be permitted to view, prior to or during a transaction process (below), discount sale offers and/or purchase corresponding discounted items. For example, a sale price club member may be permitted to purchase products designated by green flashing LEDs for a percentage off the products' retail prices.

In an embodiment, membership prices (prices which members, but not non-members, pay) might be established in order to reduce or prevent dilution. For example, in one embodiment, a membership price may be set so that any discount value provided to a member customer is sufficiently offset by the membership price and the anticipated increase in sales volume that is likely to result from the membership.

Step 200: Receive Request to Register Vending Machine Membership from Customer

In an embodiments, after a vending machine membership offer is provided to a customer at Step 100, the vending machine 100, controller 205 and/or operator may receive, in response to the offer, a request to register a vending machine membership from the customer. Such a request may constitute an acceptance of an offer provided to the customer.

Any of various manners of indicating acceptance or of indicating a request may be employed. Thus, in one embodiment, a customer may select an option to register a membership from a touch screen (an output device 155) of a vending machine 100. In another embodiment, a vending machine customer may provide, via a cellular telephone, an indication that the customer wishes to register a membership. For example, a customer may call a phone number posted on a vending machine 100 with his cellular telephone, and may be connected to controller 205, which may operate Interactive Voice Response (IVR) software to prompt the customer with menu options. In response to the menu prompts, the customer may depress keys on his cellular telephone, which causes the cellular telephone to emit DTMF tones to the controller 205, thereby indicating the customer's intention to register a membership.

A customer may provide, in conjunction with his request to register a membership, a corresponding payment (or an indication thereof). In such embodiments, customers may pay for memberships through one or more payment mediums. In one embodiment, a customer may pay for a membership in cash by providing bills and/or coins into a payment processing mechanism 315 of a vending machine 100. Further, in one embodiment, a customer may pay for a membership by providing a financial account identifier, such as by swiping a debit or credit card into a card reader (a payment processing mechanism 150) of a vending machine 100 or by providing a financial account identifier to a controller 205 via a user device (e.g. by typing a credit card number into a field of a web site hosted by controller 205). In yet another embodiment, a customer may pay for a membership by promising to perform one or more obligations to the operator and/or a third party. For example, a customer may agree to patronize a third party business provided the third party pays the operator for the cost of the membership. Such a promise may be provided to a vending machine 100 (e.g. via an input device 160), to a controller 205 (e.g. via a user device such as a cellular phone or personal computer), and/or to an operator.

In one or more embodiments, a customer may not have to pay in a conventional manner for a membership, but rather may qualify for a membership if the customer has patronized one or more vending machines to a certain degree in the past. For example, in one embodiment where a customer database or other means is used to record the identities of vending machine customers who patronize one or more vending machines, certain customers may be provided with vending machine membership offers (at Step 100). In an embodiment, customers may retain transaction records (e.g. printed receipts) to prove that they qualify for memberships (e.g. by depositing printed receipts into a bill validator). Thus, in an embodiment, such qualifying customers may not have to provide payment to a payment processing mechanism at Step 200 to a payment processing mechanism 150. Instead, customers may qualify for membership offers based on, for example, one or more of (1) the total dollar amount purchased over a period of time, (2) the identities of particular products purchased (e.g. loyal purchasers of Coke® may receive memberships), (3) the profitability of one or more products purchased, and/or (4) the number of transactions initiated within a certain period of time.

In an embodiment, the vending machine 100, controller 205 and/or operator may at Step 200 require the vending machine customer to provide answers to one or more survey questions. For example, as part of a registration process, a customer may be asked about his or her product preferences and eating habits. The answers to such questions may be recorded in a database and subsequently used by the operator to stock the machine with relevant products in subsequent fill periods.

In one or more embodiments, the customer may be required, at Step 200 to select a type of membership or other membership option. For example, a customer may be permitted to select one or more memberships from a list of possible membership types. The membership types may reflect different manufacturers, product brands (e.g. a Coke Club card), and benefit levels (e.g. Gold, Platinum, etc. for different levels of access to vending machine products). In some embodiments, membership types may have different prices associated therewith. Thus, a membership permitting customers to purchase products at cost may be priced greater than a membership that permits customer to receive 10% off retail prices.

Step 300: Determine Whether to Establish Vending Machine Membership

In an embodiment, at Step 300, a vending machine 100, controller 205 and/or operator determines, based on one or more membership rules, whether to establish a vending machine membership in response to the request received at Step 200. The step 300 may be performed after an offer for membership has been provided. Additionally or alternatively, the step 300 may be performed to determine whether to provide an offer, in which the offer is provided only if it is determined to establish a vending machine membership.

Thus, in one embodiment, a vending machine 100, controller 205 and/or operator determines whether sufficient payment has been received from a customer at Step 300 (e.g. whether or not the customer presented payment sufficient to cover the membership price) and/or whether the customer has patronized one or more vending machines to a certain degree in the past. Alternatively or additionally, it is determined whether one or more conditions exit in a database (e.g. a product inventory database 120), such as whether actual product velocity is less than ideal product velocity for one or more products.

If the relevant membership rules (if any) are satisfied, the vending machine 100, controller 205 and/or operator determines to establish a vending machine membership.

Step 400: Determine Membership Identifier

Once is it determined at Step 300 to establish a vending machine membership, a vending machine membership identifier is determined at Step 400. At Step 400, a vending machine membership identifier is determined so that it may be provided to a customer (Step 500, below), recorded (at Step 600, below) and so that a customer may subsequently claim and realize benefits associated with the corresponding membership (e.g. pursuant to a transaction process, below).

In one or more embodiments, a membership identifier comprises one or more of:

(1) A unique or substantially unique alphanumeric code generated by a vending machine 100 and/or a controller 205. For example, in one embodiment, a vending machine processor 105 may be configured to generate non-sequential numbers that may be recorded and/or provided to customers as membership identifiers.

(2) A unique or substantially unique alphanumeric code retrieved from a database. Thus, in one embodiment, a vending machine may store, in a database, membership identifiers for selection/retrieval by a processor 105 at Step 400.

(3) A unique or substantially unique identifier provided by the customer. Thus, in one embodiment, a customer may provide an identifier to a vending machine 100 and/or controller 205 via an input device 160 (e.g. a keypad) and/or a user device (e.g. a cellular telephone). The identifier may be provided either with or without an affirmative action by the customer.

a. In one or more embodiments, a customer may provide his or her contact information, including, but not limited to, the customer's name, address, phone number, email address, and the like.

b. In one or more embodiments, a customer may provide his or her social security number.

c. In one or more embodiments, a customer may request/select, as a substantially unique identifier, a personal identification number (PIN) using a keypad of a vending machine (an input device 160) and/or a user device (e.g. a keypad of a cellular telephone). In some embodiments where a customer requests/selects a PIN, the vending machine 100 and/or controller 205 may be configured to access a member database 130 to determine if a requested/selected PIN has been previously registered in accordance with a previously registered membership. If so, the vending machine may output a message to the customer (via output device 155 or an output device of a user device, such as an LCD of a cellular telephone), informing the customer that the requested/selected PIN is unavailable. The customer may alternatively or additionally be prompted to request/select another PIN, and the process may repeat until the customer has selected a substantially unique (e.g. not previously issued and/or outstanding) PIN.

d. In one or more embodiments, a customer may provide, to an input device 160 and/or a user device, a biometric identifier, including but not limited to a finger print, iris pattern, topical facial pattern, voice print, signature, or the like.

e. In one or more embodiments, a customer's user device may provide an identifier to a vending machine 100 and/or controller 205 and that provided identifier may serve as a membership identifier. For example, in one embodiment, a customer's cellular telephone number may be transmitted to the vending machine 100 and/or controller 205, directly or indirectly, via automatic number identification (ANI) technology. In another embodiment, a user device's serial number or other identifier (e.g., a cellular telephone's Electronic Serial Number, Mobile Identification Number and/or System Identification Code) may be transmitted to the vending machine 100 and/or controller 205.

f. Input may be received from a user device without an affirmative action by the customer. For example, a cellular telephone's Electronic Serial Number, a cellular telephone's Mobile Identification Number, a cellular telephones System Identification Code, the unique signature of a cellular telephone or the unique signature of an RFID transmitter or the like may be detected and used to form an identifier.

Step 500: Provide Indication of Membership Identifier to Customer

At Step 500, an indication of the membership identifier (e.g., determined at Step 400) is provided to the customer. Such an indication may be provided via output device 155 of a vending machine and/or an output device of a user device. In an embodiment where the customer is not required to affirmatively input a membership identifier (e.g., where the customer can be otherwise identified), it can be acceptable to not provide an indication of the membership identifier to the customer. For example, the membership identifier can be directly provided/programmed to a customers device. In another embodiment, where the membership identifier was formed from data already retrievable from the customer without affirmative action by the customer (e.g., detecting a unique signature of a customers cell phone, detecting a code associated with a customers cell phone), it can be acceptable to not provide an indication of the membership identifier at all.

In embodiments where the customer requests/selects a membership identifier, the vending machine customer may be informed at Step 500 as to whether or not the requested/selected membership identifier was determined at Step 400 to be appropriate for registration. For example, a message may be output via an LCD screen reading, "your selected PIN was successfully registered as your membership identifier." Or, if the vending machine 100 and/or controller 205 determines that the requested identifier exists in member database 130, it may instruct the customer to select another identifier. Such a subroutine may repeat until the customer has selected an appropriate (e.g. not previously registered) membership identifier.

In embodiments where the vending machine 100, controller 205 and/or operator determines a membership identifier, the determined membership identifier may be output to the customer via an output device 155 of a vending machine and/or an output device of a user device (e.g. an LCD screen of a cellular telephone). Thus, in one embodiment, a vending machine may print or otherwise record, on a paper ticket or card (e.g. a magnetic stripe card), a membership identifier. The paper ticket or card may, in turn, be retained by the customer as the customer's "membership card." In another embodiment, the membership identifier may be downloaded to a customer's user device, and may be stored in a local memory of the user device (e.g. in cache memory) for subsequent retrieval during a transaction process (described herein).

Step 600: Record Membership Information in Member Database

In some embodiments, at Step 600, the determined membership identifier is stored in a member database 130 (FIG. 6) in association with terms of the membership (e.g., duration of membership, other conditions of membership, other associated benefits and privileges) and/or other membership information (the membership type and the customer's name). Additional information may also be recorded in the corresponding record, such as customer contact information and the like.

Further, in one or more embodiments, an expiration date associated with the membership is determined and recorded in the member database 130. For example, assuming a customer purchases, on Jun. 18, 2004, the "sale price club card" described in the second record of FIG. 5, the vending machine 100, control system 205 and/or operator may determine that, based on the corresponding membership duration ("one year from date of purchase"), the expiration date for the membership should be Jun. 18, 2005.

Step 700: Provide Initial Benefits of Membership Registration (if any)

In some embodiments, a vending machine 100, controller 205 and/or operator may provide an entity, such as a customer, an operator and/or a product manufacturer, with any initial benefits that may be due from the mere registration of a membership. Such initial benefits may be provided at discrete times, such as substantially immediately after the membership is established, or at the first transaction after the membership is established.

Thus, in one embodiment, a customer may receive a "premium" for establishing a membership. Such initial benefits may include, but are not limited to, one or more products dispensed from a vending machine. Products may comprise those randomly-selected products that are selling at less than their ideal item velocity, products selling a low actual item velocity, products near their expiration date, and/or products with a certain per-unit profit margin.

In another embodiment, a member customer may receive a benefit for every other customer they convince to sign up for a membership. Thus, a first member customer may provide an identifier to friends, family, associates, acquaintances and the like, which (1) identifiers the first member and (2) permits the recipient/presenter to register for a vending machine membership. When the recipient/presenter registers (Steps 200-600, above), the vending machine 100 and/or controller 205 may record, in a member database, an indication of the registration in a record corresponding to the first member customer. Based on how many additional customers the first member customer "signs up", the first member customer may receive a benefit, such as cash, discounts, vending machine products, or the like.

Further, in one embodiment, an entity other than a customer may receive a benefit when a customer successfully registers a membership. For example, an operator may receive credit from a product manufacturer for each customer that is registered for a membership associated with the product manufacturer. For example, The Coca-Cola Company or Coca-Cola Enterprises may provide the operator with $1.00 for each customer that purchases a membership that entitles the customer to discounts off Coke® products.

Transaction Process

In one or more embodiments, a vending machine 100 is configured to process both membership-based transactions and conventional vending machine transactions (i.e. to non-members, to members that are not identified as such). For example, pursuant to a transaction process of one or more embodiments, non-member customers may be permitted to purchase vending machine products at their retail prices, while member customers may be permitted to purchase vending machine products at promotional (e.g. discounted) prices.

Figure 8:
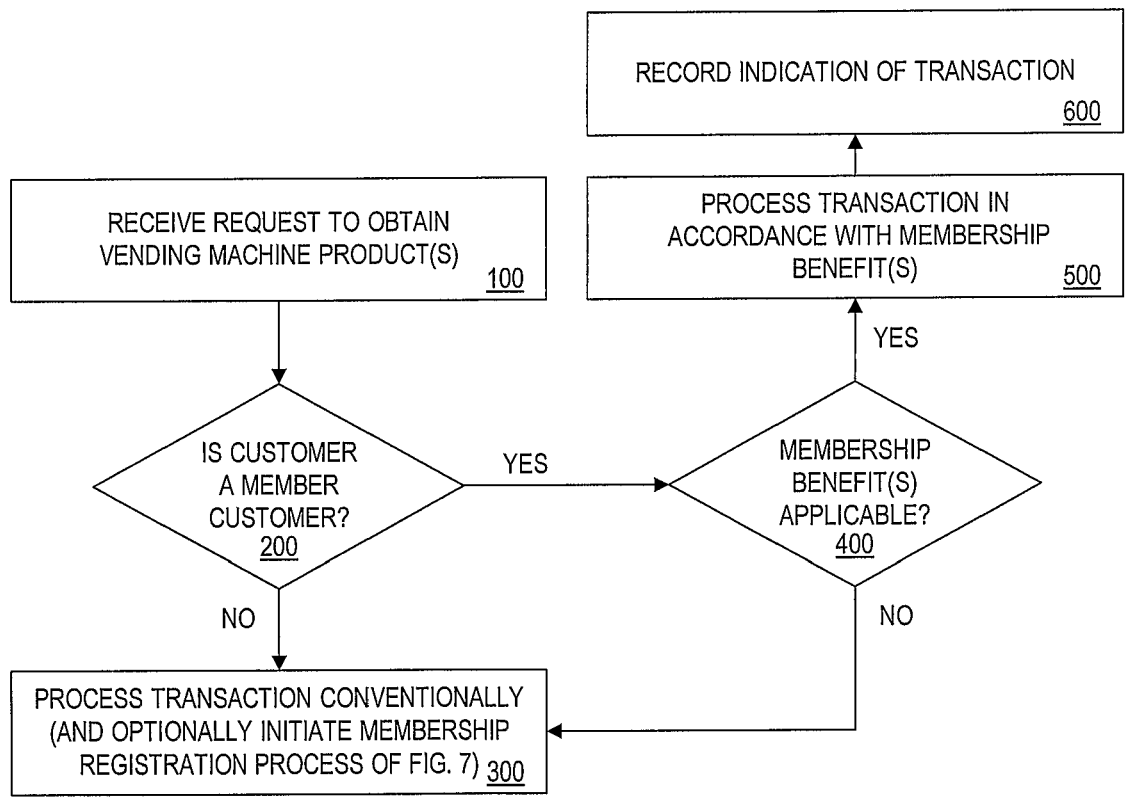
FIG. 8 is a flow diagram illustrating an embodiment of a transaction process.

According to one or more embodiments, a transaction process follows one or more steps of FIG. 8, which are discussed below:

Step 100: Receive Request to Obtain Vending Machine Product(s)

In one embodiment, a transaction process begins at Step 100 where a vending machine 100 and/or a controller 205 receives, from a customer, a request to obtain one or more vending machine products.

Pursuant to Step 100, the customer may deposit payment into a payment processing mechanism 315, for example, by depositing bills and/or coins, swiping a magnetic stripe card, or the like. Further in some embodiments, a customer may enter, into an input device of the vending machine (such as a touch screen), an account identifier. In some account identifier embodiments, an account identifier corresponds to a financial account (e.g. a credit card account, a debit card account, a PayPal™ account, etc.). Further, according to some account identifier embodiments, a customer may enter a code previously registered or issued upon the establishment of a vending machine account, such as a prepaid "subscription" account, that enables a customer to receive several units of product over a period of time. Vending machine subscription accounts are described at length in Applicant's U.S. Provisional Patent Application No. 60/527,988, entitled APPARATUS, SYSTEM AND METHOD FOR ESTABLISHING MULTI-TRANSACTION RELATIONSHIPS WITH VENDING MACHINE CUSTOMERS, filed Dec. 9, 2003; U.S. Pat. No. 6,298,972, entitled METHOD AND APPARATUS FOR ESTABLISHING AND MANAGING VENDING MACHINE SUBSCRIPTIONS, issued Oct. 9, 2001; U.S. Pat. No. 6,085,888, entitled METHOD AND APPARATUS FOR ESTABLISHING AND MANAGING VENDING MACHINE SUBSCRIPTIONS, issued Jul. 11, 2000; and U.S. Pat. No. 5,988,346, entitled METHOD AND APPARATUS FOR ESTABLISHING AND MANAGING VENDING MACHINE SUBSCRIPTIONS, issued Nov. 23, 1999; the entirety of each is incorporated by reference herein.

Alternatively or additionally, pursuant to Step 100, a customer may indicate a membership identifier. The customer may provide the indication via input device 160 and/or via a user device. The membership identifier may also be provided without affirmative action by the user (e.g., it may be detected from a user device). For example, a user device or other device may emit (continually, substantially continually, intermittently, upon request by the vending machine or another device) a signal that is detectable by, e.g., a vending machine (e.g., detectable by an input device of the vending machine). This signal may represent a membership identifier, encode a membership identifier, or otherwise allow a membership identifier to be determined. In one embodiment, the user device is a Bluetooth enabled device which uses the Bluetooth wireless communication protocol to connect and communicate with the vending machine via short range radio frequency.

Alternatively or additionally, pursuant to Step 100, a customer may indicate a selection of one or more products that the customer intends to purchase from the vending machine 100. The customer may provide his or her selection via an input device 160 and/or via a user device.

In some embodiments, a user device and/or controller 205 may, in whole or part, receive the transaction request from the vending machine customer. Thus, in some embodiments, a customer may transmit an account identifier to a controller 205 and/or a vending machine 100 via a user device such as a cellular telephone or personal computer. Also, in some embodiments, a customer may transmit a selection of one or more products to controller 205 and/or a vending machine via a user device such as a cellular telephone or personal computer. For example, a customer may call a phone number posted on a vending machine 100 with her cell phone, and a server (controller 205) running Interactive Voice Response (IVR) software may prompt her to enter an account identifier and a row position identifier corresponding to a product that she wishes to obtain from the vending machine 100.

Step 200: Determine Whether Customer is a Member Customer

At Step 200, the vending machine and/or controller 205 determines whether or not the customer is a member customer. In one embodiment, a vending machine and/or controller may access a member database 130 (FIG. 6) to determine whether a member identifier received at Step 100 corresponds to a valid membership. For example, a vending machine and/or controller 205 may determine whether or not a corresponding record exists in the member database, and if not, may either (1) prompt the customer for another identifier (ask the customer whether he provided the correct member identifier), or (2) assume the customer is not a member, and proceed to Step 300, below. Further, if a corresponding record exists in the member database 130, the vending machine and/or controller 205 may determine whether or not the corresponding membership has expired by comparing a current system time/date to the corresponding membership expiration time/date. If the corresponding membership is expired or is otherwise invalid, the process may continue at Step 300, below. If, on the other hand, the customer is determined at Step 200 to be a member customer, the process continues at Step 400, below.

In an alternate embodiment, a vending machine 100 and/or controller 205 may determine whether or not a customer is a member customer at Step 200 without reference to a member database. For example, the membership identifier itself may be verified (and determined to be an authentic membership identifier) without reference to a member database or other stored list of membership identifiers.

In one embodiment, a vending machine 100 and/or controller 205 may initiate a checksum procedure to evaluate the authenticity of a numeric membership identifier. If the identifier passes the checksum evaluation, the customer may be assumed to be a member customer. As stated, if a customer is determined to be a member customer, the process continues at Step 400, below.

Step 300: If Customer is not a Member Customer, Process Transaction Conventionally.

At Step 300, because the customer is determined to not be a member customer, the vending machine 100 and/or controller 205 processes a transaction in a conventional manner by, for example, dispensing inventoried products upon tender of payment equal to the sum of the selected products' retail prices.

Alternatively, rather than processing a transaction conventionally at Step 300 if the customer is not a member customer, the vending machine 100 and/or controller 205 may restrict or prevent entirely the non-member customer's ability to transact with the machine. Such an embodiment would function to encourage or indeed require a customer to register as a member.

If it is determined that a vending machine customer is not a member customer, then an offer to become a member may be output, as described herein. In addition or in the alternate, if it is determined that a vending machine customer is not a member customer, the vending machine and/or controller 205 may initiate registration process of FIG. 7, above, in an effort to register the customer as a member.

Step 400: If Customer is a Member Customer, Determine Applicable Membership Benefits.

At Step 400, when the customer is determined to be a member customer, it is determined which terms (e.g., membership benefits) should be applied to the transaction. Thus, in one embodiment, a vending machine 100 and/or controller 205 consults a membership rules database 125 to determine one or more benefits to be provided to the member customer.

Generally, a vending machine membership permits a member customer to realize a benefit at a vending machine 100. Such membership benefits include, but are not limited to, one or more of the following:

1. The ability to receive one or more products.
    a. For example, in one embodiment, a member customer may be permitted to receive, during a transaction process, one or more products without (again) tendering payment (i.e. without paying more than the membership price). For example, in one embodiment, a member customer who purchased a $100 annual membership may be permitted to receive up to two items per day from a vending machine.
        i. In some embodiments, customers may be permitted to select such products from a group of products that may be indicated, at Step 400, through one or more output devices 155, such as LCDs and/or shelf-mounted LEDs. For example, at Step 400 (and/or before Step 400), LED lights mounted on shelves and corresponding to product rows may flash, indicating which items are available for selection. Thus, in some embodiments, the vending machine 100 and/or controller 205 may dynamically change the group of products from time to time, based on changes in supply and demand, and may communicate any changes in the group composition through one or more output devices 155. For example, a stored rule may provide that if a product's actual product velocity falls to less than 25% of its ideal product velocity, the product should be added to a group from which a member customer may select one or more products pursuant to a membership. LED lights may flash next to the corresponding products so that a member may determine which products comprise the group from which he may select one or more products.
    b. In another embodiment, member customers may be permitted to receive additional "free" items when they purchase one or more other items at retail prices.
2. The ability to purchase items at discount or sale prices (i.e. at prices less than retail prices).
    a. For example, in one or more embodiments, members may purchase items at wholesale prices or cost.
    b. Further, in one or more embodiments, only members may realize discount or sale prices.
        i. For example, in one embodiment where member customers may purchase one or more products at discount or sale prices, the one or more discounted products may be indicated to member customers, at Step 400, through one or more output devices 155, such as LCDs and/or shelf-mounted LEDs. For example, at Step 400 (and/or before Step 400), LED lights mounted on shelves and corresponding to product rows may flash, indicating which items are available for a discount (e.g. $0.25 off, 50% off, etc.).
        ii. Further, in one or more embodiments, the products that member customers may purchase at discount prices may be determined dynamically, according to algorithms that function to allocate inventoried products to one or more inventory groups based on stored rules, and/or based on supply and demand data. For example, a stored rule may indicate that all inventoried products selling at 25% their ideal product velocity are to be allocated to a "sale" group, from which member customers may select one or more products for purchase at discount prices. As discussed above, LED lights mounted proximately to the "sale" group products may flash, so that member customers can see which items they may purchase at discount or sale prices (e.g. at 50% off). Apparatus, systems and methods for dynamically allocating inventory to one or more inventory groups based on one or more rules which consider supply and demand are provided in Applicant's co-pending U.S. Provisional Patent Application No. 60/560,960, entitled APPARATUS, SYSTEM AND METHOD FOR VENDING A COMBINATION OF PRODUCTS, filed Apr. 9, 2004, the entirety of each of which is incorporated by reference herein.
        iii. Additionally, in one or more embodiments, sale prices may be dynamically calculated by considering stored rules and/or supply and demand data. Apparatus, systems and methods for dynamically pricing vending machine products according to supply and demand data are provided in Applicant's co-pending U.S. patent application Ser. No. 08/947,798, entitled METHOD AND APPARATUS FOR DYNAMICALLY MANAGING VENDING MACHINE INVENTORY PRICES, filed Oct. 9, 1997; and U.S. Patent Application 60/511,875, entitled METHOD AND APPARATUS FOR DYNAMICALLY MANAGING VENDING MACHINE INVENTORY PRICES, filed Oct. 16, 2003, the entirety of each of which is incorporated by reference herein.

1. Because, in some embodiments, member customers may purchase memberships for a fee (e.g. pursuant to a membership registration process, above), any discount provided to a member through discount or sale pricing may be offset by the revenue realized from the sale of the membership, thereby reducing or eliminating the risk of dilution.

3. The ability to participate in, and receive benefits pursuant to, various promotions.
   a. For example, in one embodiment, member customers may receive sweepstakes entries. It should be noted that, in some jurisdictions where the invention may be practiced, memberships that provide customers with sweepstakes entries might be free (e.g. no membership fee is charged during a membership registration process, above).
   b. Alternatively or additionally, member customers may be permitted to "spin" a game wheel, which may be illustrated on a touch screen of a vending machine 100 (e.g. a virtual game wheel) or mounted to a vending machine (e.g. a physical game wheel). The spinning of a game wheel may determine one or more benefits to be provided to a customer (e.g. free product, discounts, cash prizes, etc.). Various game-themed vending machine promotions, as well as appropriate apparatus, systems and methods therefore, are described at length in Applicant's co-pending U.S. Provisional Patent Application No. 60/527,899, entitled APPARATUS, SYSTEM AND METHOD FOR GAME-THEMED VENDING MACHINE PROMOTIONS, the entirety of which is incorporated by reference herein.

4. The ability to receive and/or send messages through a vending machine 100.
   a. For example, member customers may be permitted to record audio and/or video messages for other customers who may access such messages at vending machine 100, and/or through a user device, such as a cellular phone or personal computer.
   b. In some embodiments, member customers may be permitted to send and/or receive email messages through a vending machine 100. Embodiments related to sending and receiving of email messages are described in U.S. Provisional Patent Application Ser. No. 60/662,139, entitled "WiFi Vending Machine", filed Mar. 15, 2005 in the name of Signorelli et al., which is incorporated herein by reference.
   c. Further, in some embodiments, member customers may be permitted to make long distance telephone calls, for free or at a discount, through a vending machine 100. Thus, in such embodiments, a membership card may function, in some respects, as a phone card. In such embodiments, a vending machine 100 may feature, as a combined input device 160 and output device 155, a telephone handset and/or keypad.

5. The ability to receive entertainment content (i.e. intangible products).
   a. For example, a vending machine 100 may output, through an LCD screen or CRT monitor (output devices 155), video content (e.g. movie trailers, news) upon the presentation of a valid membership.
   b. In another embodiment, a vending machine 100 may output, through a speaker (an output device 155), audio content such as music, news, or the like.
   c. Further, in another embodiment, a vending machine 100 may permit a customer to download digital content (e.g. music files, ring tones, etc.) to a user device (e.g. an MP3 player, a cellular phone).
   d. In another embodiment, a vending machine 100 may allow a customer to access the Internet, use email services and the like.
   e. In another embodiment, a vending machine 100 may allow a customer to shop (e.g., via web sites of online merchants).

6. Other benefits
   a. Preferable mortgage rates

In one or more embodiments, a vending machine 100 and/or controller 205 may consult, at Step 400, a database to determine whether or not one or more membership benefits are applicable at the time of the transaction. Thus, one or more fields (not shown) may be added to membership rules database 125, which provide, for each membership type, conditions which must be present at the time of the transaction in order for a member to receive corresponding benefits. For example, in one embodiment, a condition may be that, in order for a member to receive a discount or a free product, less than 2 days remain in the fill period. Further, in one embodiment, a condition may be that, in order for a member to receive a discount or a free product, demand for one or more products must fall below a certain threshold (e.g. actual product velocity must fall short of ideal product velocity). Thus, the provision of membership benefits during a transaction process may be conditioned upon then-current data.

If it is determined at Step 400 that no membership benefits are to be provided to the member customer, the process may continue at Step 300, above, where a transaction may be processed conventionally (e.g. the member customer may be guided to purchase one or more products at posted retail prices). Otherwise, the process continues at Step 500.

Step 500: Process Transaction in Accordance with Applicable Membership Benefits.

At Step 500, a vending machine 100 and/or controller 205 processes a transaction in accordance with the applicable membership benefit(s).

In embodiments where a member customer is entitled to receive one or more products, the vending machine 100 and/or controller 205 may activate one or more dispensing mechanisms 170 so that the customer may receive the product(s). Alternatively or additionally, the vending machine 100 and/or controller 205 may activate one or more output devices, so that a customer may receive intangible products, such as digital content. For example, a vending machine 100 may permit a customer to download digital content to a user device via an output device 155.

In embodiments where a member customer is entitled to receive a discount, a vending machine 100 and/or controller 205 may permit a customer to receive one or more products at prices less than the products' corresponding retail prices. In some embodiments, discount amounts may be percentages off retail prices (e.g. 10% off) or fixed dollar amounts off retail prices (e.g. $0.50 off).

In embodiments where a member customer is entitled to participate in a sweepstakes or game-themed promotion, the vending machine 100 and/or controller 205 may randomly (or otherwise) determine an outcome that corresponds to a promotional entitlement. For example, a vending machine 100 may activate (i.e. "spin") a prize wheel apparatus and, based on a randomly determined outcome, stop the prize wheel so as to visually indicate the customer's entitlement to a free product or a discount (e.g. a wheel may spin and "resolve" to show a product's icon). The vending machine 100 may provide the entitlement (e.g. dispense a product) or may the print a record of the entitlement so that the customer may redeem the entitlement at a later time.

In an embodiment, at the end of a transaction, or at another time, the expiration of the applicable membership may be determined. At the end of a transaction, a vending machine 100 and/or controller 205 may determine whether or not a member customer's membership is about to expire by, for example, comparing a system time/date to a membership expiration time/date stored in a member database 130. If the system time/date is within a certain range of the membership expiration time/date, the vending machine 100 and/or controller 205 may output a "renewal offer", which the member customer may accept to renew or extend an existing membership. In some embodiments, the vending machine 100 and/or controller 205 may charge a customer's financial account to cover the price of the extended membership.

In an embodiment, a vending machine 100 and/or controller 205 may automatically renew a membership if it expires. In some automatic renewal embodiments, the vending machine 100 and/or controller 205 may charge the member's financial account for the price of the renewal. Thus, the customer may provide a financial account identifier upon initial registration (e.g. at Step 200 of the membership registration process, above) that can be subsequently recalled by the vending machine 100 and/or controller 205 at the end of a membership duration.

In an embodiment, it can be advantageous to limit the amount of benefits receivable per unit time (e.g., per day). For example, it can be desirable to limit the number of units of a free product that are dispensable to members in a day. Thus, the benefits provided can be tracked as described herein, and compared with a maximum amount of benefits providable in a time period (e.g., during the day). Benefits could then be prevented from being provided if the maximum has been reached.

Step 600: Record Indication of the Transaction

At Step 600, in some embodiments, the vending machine 100 and/or controller 205 records, in a database, an indication of the transaction. For example, in one embodiment, a transaction database may be updated to reflect the time and date of the transaction, an indication of which products were purchased and/or dispensed, the identity of the customer, whether or not the customer was a member, the price at which one or more products were purchased, the then-existing retail prices of purchased products, etc.

In embodiments which contemplate several vending machines, it may be beneficial to record such transaction data so that one or more operators or other entities may financially reconcile with one another after the transaction (e.g. at the end of a fill period). For example, in one embodiment, memberships are honored at many machines. In such an embodiment, a second machine may provide a discount to a member customer who purchased a membership from a first machine. Subsequently, the operator of the second machine may, based on a record of the discounted transaction (created at Step 600), seek reimbursement from the operator of the first machine for the difference between the retail price of the dispensed product and the discount price. Thus, the second machine may be configured to honor memberships issued from a first vending machine.

Various additional embodiments are contemplated as being within the scope of the disclosed inventions. For example, in an embodiment, a member customer may receive a refund of a membership price. It can be beneficial to communicate the refund and conditions thereof to the customer (e.g., upon offering the membership to the customer, upon the customer registering for the membership). Further, in some embodiments, the refund may be conditioned on/triggered by the occurrence of one or more events, such as the customers' patronage of a vending machine and/or the passage of a particular amount of time. For example, a refund of a membership price may be conditioned on customer's purchase of more than $20 worth of products within the first month of the membership. Data regarding the customer's patronage may be recorded and tracked in a transaction database.

What is claimed is:

1. A method comprising:
   determining, by a vending machine equipped with a processor, an internet connection and a visual display device and based on demand for a first product stored in the vending machine, a term of an offer to establish a membership at the vending machine;
   providing, by the vending machine and to a customer of the vending machine, the offer via the display device;
   receiving, by the vending machine and from the customer, an indication of an acceptance of the offer;
   determining, by the vending machine, an amount of payment that is required to establish the membership;
   determining, by the vending machine, whether the amount of payment has been received; generating, by the vending machine and in the case that it is determined that the amount of payment has been received, a membership identifier that includes a plurality of alphanumeric digits;
   storing, by the vending machine, the membership identifier in association with the term of the membership;
   receiving, by the vending machine, from the customer, and after the storing of the membership identifier, the membership identifier via an input device;
   determining, by the vending machine and based on the received membership identifier, the term of the membership;
   receiving, by the vending machine and from the customer, after the determining of the term of the membership based on the received membership identifier, a selection of a second product that the customer intends to purchase from the vending machine;
   determining, by the vending machine, a product having a sales velocity that is less than an ideal sales velocity thereof; and
   selling, by the vending machine and to the customer, after determining that the product has a sales velocity that is less than an ideal sales velocity, the product at a discount.

2. A method comprising:
   providing, by a vending machine equipped with a processor, an internet connection and a visual display device and to a customer of the vending machine, an offer to establish a membership at the vending machine;
   receiving, by the vending machine, an acceptance of the offer;
   determining, by the vending machine, a membership identifier;
   storing, by the vending machine, the membership identifier in association with the term of the membership;
   receiving, by the vending machine, the membership identifier after the step of storing;
   determining, by the vending machine, the term of the membership;

receiving, by the vending machine and from the customer, a selection of a product that the customer intends to purchase; and processing, by the vending machine, a transaction at the vending machine in accordance with the term and the selection.

3. The method of claim 2, further comprising:

determining a term of the offer based on demand for a product.

4. The method of claim 2, further comprising:

determining a term of the offer based on supply of a product.

5. The method of claim 2, further comprising:

providing the customer with a plurality of membership options;

receiving, from the customer, a selection of at least one of the membership options; and determining a term of the offer based on the received selection.

6. The method of claim 2, further comprising:

determining an identifier which uniquely represents the membership.

7. The method of claim 2, further comprising:

determining an amount of payment that is required to establish the membership.

8. The method of claim 7, further comprising:

determining whether the amount of payment has been received.

9. The method of claim 2, further comprising:

providing the customer with an initial benefit of membership.

10. The method of claim 9, in which providing the customer with an initial benefit of membership comprises:

determining a product having a sales velocity that is less than an ideal sales velocity thereof; and dispensing the product.

11. The method of claim 2, further comprising:

determining to provide the offer.

12. The method of claim 11, in which determining to provide the offer comprises:

determining to provide the offer based on at least one of
demand for a product, and
supply of a product.

13. The method of claim 11, in which determining to provide the offer comprises:

determining to provide the offer based on previous purchases by the customer.

14. A method comprising:

receiving an identifier that indicates a membership of a customer at a vending machine equipped with a processor, an internet connection and a visual display device;

determining a term of the membership;

receiving, from the customer, a selection of a product that the customer intends to purchase; and processing a transaction at the vending machine in accordance with the term and the selection, determining whether the amount of payment has been received.

15. The method of claim 14, in which processing a transaction at the vending machine equipped with a processor, an internet connection and a visual display device in accordance with the term and the selection comprises:

dispensing a product without receiving additional payment for the product;

selling a product at a discount;

participating in a promotion;

receiving a message via the vending machine;

sending a message via the vending machine; and receiving video content via the vending machine.

16. The method of claim 14, in which processing a transaction at the vending machine equipped with a processor, an internet connection and a visual display device in accordance with the term and the selection comprises:

determining a product having a sales velocity that is less than an ideal sales velocity thereof.

17. The method of claim 16, in which processing a transaction at the vending machine equipped with a processor, an internet connection and a visual display device in accordance with the term and the selection comprises:

dispensing the product without receiving additional payment for the product.

18. The method of claim 16, in which processing a transaction at the vending machine equipped with a processor, an internet connection and a visual display device in accordance with the term and the selection comprises:

selling the product at a discount.

19. The method of claim 14, further comprising:

determining, based on the term, whether a membership benefit is to be provided.

20. The method of claim 14 in which determining a term of the membership comprises:

using the identifier to identify a record in a database; and
determining the term from the record.

* * * * *